(12) United States Patent
Gupta et al.

(10) Patent No.: US 8,705,501 B2
(45) Date of Patent: Apr. 22, 2014

(54) METHOD AND APPARATUS FOR FACILITATING A COMMUNICATION BETWEEN AN ACCESS POINT BASE STATION AND A NEIGHBORING BASE STATION

(75) Inventors: Rajarshi Gupta, Santa Clara, CA (US);
Rajat Prakash, La Jolla, CA (US);
Oronzo Flore, Ostuni (IT)

(73) Assignee: QUALCOMM Incorporated, San Diego, CA (US)

( * ) Notice: Subject to any disclaimer, the term of this patent is extended or adjusted under 35 U.S.C. 154(b) by 460 days.

(21) Appl. No.: 12/717,743

(22) Filed: Mar. 4, 2010

(65) Prior Publication Data
US 2010/0227603 A1   Sep. 9, 2010

Related U.S. Application Data

(60) Provisional application No. 61/158,539, filed on Mar. 9, 2009, provisional application No. 61/158,662, filed on Mar. 9, 2009.

(51) Int. Cl.
*H04W 4/00* (2009.01)
(52) U.S. Cl.
USPC .......................... 370/338; 370/328; 455/422.1
(58) Field of Classification Search
USPC ........... 455/418–420, 422.1, 432.1, 433–439, 455/442–445, 456.5, 464, 550.1, 552.1, 455/560–562.1; 370/310.2, 322, 324, 328, 370/329, 331, 338, 341, 348, 350–356
See application file for complete search history.

(56) References Cited

U.S. PATENT DOCUMENTS

| | | | |
|---|---|---|---|
| 7,881,340 B2 * | 2/2011 | Farrag et al. | 370/468 |
| 2006/0034250 A1 * | 2/2006 | Kim et al. | 370/350 |
| 2008/0096573 A1 * | 4/2008 | Chu | 455/450 |
| 2009/0052395 A1 * | 2/2009 | Bao et al. | 370/331 |
| 2010/0027694 A1 * | 2/2010 | Touboul et al. | 375/260 |
| 2011/0021240 A1 * | 1/2011 | Hiltunen et al. | 455/522 |
| 2011/0194535 A1 * | 8/2011 | Johansson et al. | 370/331 |
| 2011/0243097 A1 * | 10/2011 | Lindqvist et al. | 370/331 |

FOREIGN PATENT DOCUMENTS

| | | |
|---|---|---|
| EP | 2104284 A1 | 9/2009 |
| WO | WO2008087833 A1 | 7/2008 |

OTHER PUBLICATIONS

3GPP TSG RAN WG3: "3GPP TS 36.423; Evolved Universal Terrestrial Radio Access Network (E-UTRAN); X2 Application Protocol (X2AP)", 3GPP TS 36.423 V8.5.0, vol. 36.423, No. V8.5.0, Mar. 1, 2009, pp. 1-100, XP002558909, [retrieved on Dec. 4, 2009].

(Continued)

*Primary Examiner* — San Htun
(74) *Attorney, Agent, or Firm* — Ashish L. Patel

(57) ABSTRACT

Aspects are disclosed for self-configuring an access point via a backhaul connection. A backhaul connection is established between an access point base station and a neighboring base station. Information associated with an external neighbor parameter is then received via the backhaul connection, and an internal neighbor parameter is self-configured based on the external neighbor parameter.

28 Claims, 11 Drawing Sheets

(56) References Cited

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8) 3GPP Standard; 3GPP TS 36.300, 3rd Generation Partnership Project (3GPP), Mobile Competence Centre; 650, Route des Lucioles; F-06921 Sophia-Antipolis Cedex; France, No. V8.8.0, Mar. 1, 2009, pp. 1-157, XP050377583, p. 45, line 3-p. 50, line 15.
International Search Report and Written Opinion—PCT/US2010/026712—ISA/EPO—Jun. 16, 2010.
3GPP, "LTE; Evolved Universal Terrestrial Radio Access (E-UTRA) and Evolved Universal Terrestrial Radio Access Network (E-UTRAN); Overall description; Stage 2 (3GPP TS 36.300 version 8.7.0 Release 8)", ETSI TS 136300 V8.7.0, Jan. 28, 2009 http://www.etsi.org/deliver/etsi_ts/136300_136399/136300/08.07.00_60/ts_136300v080700p.pdf.
3GPP, "LTE; Evolved Universal Terrestrial Radio Access Network (E-UTRAN); X2 Application Protocol (X2AP) (3GPP, TS 36.423 version 8.4.0 Release 8)", ETSI TS 136 423 V8.4.0, Jan. 16, 2009 http://www.etsi.org/deliver/etsi_ts/136400_136499/136423/08.0-4.00_60/ts_136423v080400p.pdf.
Taiwan Search Report—TW099106823—TIPO—May 31, 2013.

\* cited by examiner

METHOD AND APPARATUS FOR FACILITATING A COMMUNICATION BETWEEN AN ACCESS POINT BASE STATION AND A NEIGHBORING BASE STATION

CROSS-REFERENCE TO RELATED APPLICATIONS

This application claims the benefit of U.S. Provisional Patent application Ser. No. 61/158,539 entitled "Method and Apparatus to Enable Active Noise Reduction Mechanisms for Access Point Base Stations," which was filed Mar. 9, 2009, and U.S. Provisional Patent application Ser. No. 61/158,662 entitled "Method and Apparatus to Enable Communication Among Access Point Base Stations," which was filed Mar. 9, 2009. The aforementioned applications are herein incorporated by reference in their entirety.

BACKGROUND

I. Field

The following description relates generally to wireless communications, and more particularly to methods and apparatuses for facilitating a communication between an access point base station and a neighboring base station.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Recent developments in LTE technology have been directed towards efficient use of Automatic Neighbor Relation (ANR). For instance, in LTE Release 8, added support for ANR among cells was provided, which allows evolved Node Bs (eNBs) and evolved Home Node Bs (HeNBs) to recognize their neighbors. Subsequent to creating a neighbor relation, (H)eNBs can communicate with each other to exchange further information.

Several different mechanisms are available to assist with ANR. For example, UE measurement reports can be utilized which list other eNBs and HeNBs that the UE can hear. ANR may also be assisted via operation and maintenance (OAM) insertion and updating of entries into the neighbor relation table. Other contemplated mechanisms include potentially using a receiver co-located at the node to detect system information blocks (SIBs) from neighboring (H)eNBs or eNBs, which would typically be available only at a HeNB. Also, although a backhaul X2 connection can be used to communicate with a neighboring eNB and share information about its neighbors, such mechanism is not available in HeNBs since they do not support X2 interfaces.

Since HeNBs may be sporadically deployed in an area, ANR can be particularly useful for HeNBs. Namely, since the HeNB landscape of an area may vary frequently, coordinating with such HeNBs to share available resources is particularly important. Accordingly, it would be desirable to develop a method and apparatus for augmenting the ANR mechanism for use with HeNBs.

The above-described deficiencies of current wireless communication systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with a backhaul-based self-configuration of an access point. In one aspect, methods and computer program products are disclosed for facilitating a communication between access points. Within such embodiments, a backhaul connection is established between an access point base station and a neighboring base station. Information associated with an external neighbor parameter is then received via the backhaul connection, and an internal neighbor parameter is self-configured as a function of the external neighbor parameter.

In another aspect, an apparatus for facilitating a communication between access points is disclosed. Within such embodiment, the apparatus includes a processor configured to execute computer executable components stored in memory. The computer executable components include a backhaul component, a communication component, and a configuration component. The backhaul component is configured to establish a backhaul connection between an access point base station and a neighboring base station, whereas the communication component is configured to receive information associated with an external neighbor parameter via the backhaul connection. The configuration component is then configured to self-configure an internal neighbor parameter based on the external neighbor parameter.

In a further aspect, another apparatus is disclosed. Within such embodiment, the apparatus includes means for connecting, means for receiving, means for self-configuring, means for transmitting, means for triggering, means for ascertaining, means for detecting, and means for determining. For this embodiment, the means for connecting establishes a backhaul connection between an access point base station and a neighboring base station, whereas the means for receiving includes means for receiving information associated with an external neighbor parameter via the backhaul connection. The means for configuring self-configures an internal neighbor parameter based on the external neighbor parameter. The apparatus may also include a means for transmitting an internal configuration update based on the internal neighbor parameter, and a means for triggering the means for transmitting according to a pre-determined trigger. In one aspect, a means for ascertaining is included to ascertain a transmission pattern pertaining to a plurality of external configuration updates such that the pre-determined trigger based on the transmission pattern. In another aspect, a means for detecting an activation of the access point base station is included such that the pre-determined trigger based on the activation. In an further aspect, a means for determining a random time offset is included, wherein the means for transmitting is delayed based on the random time offset.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
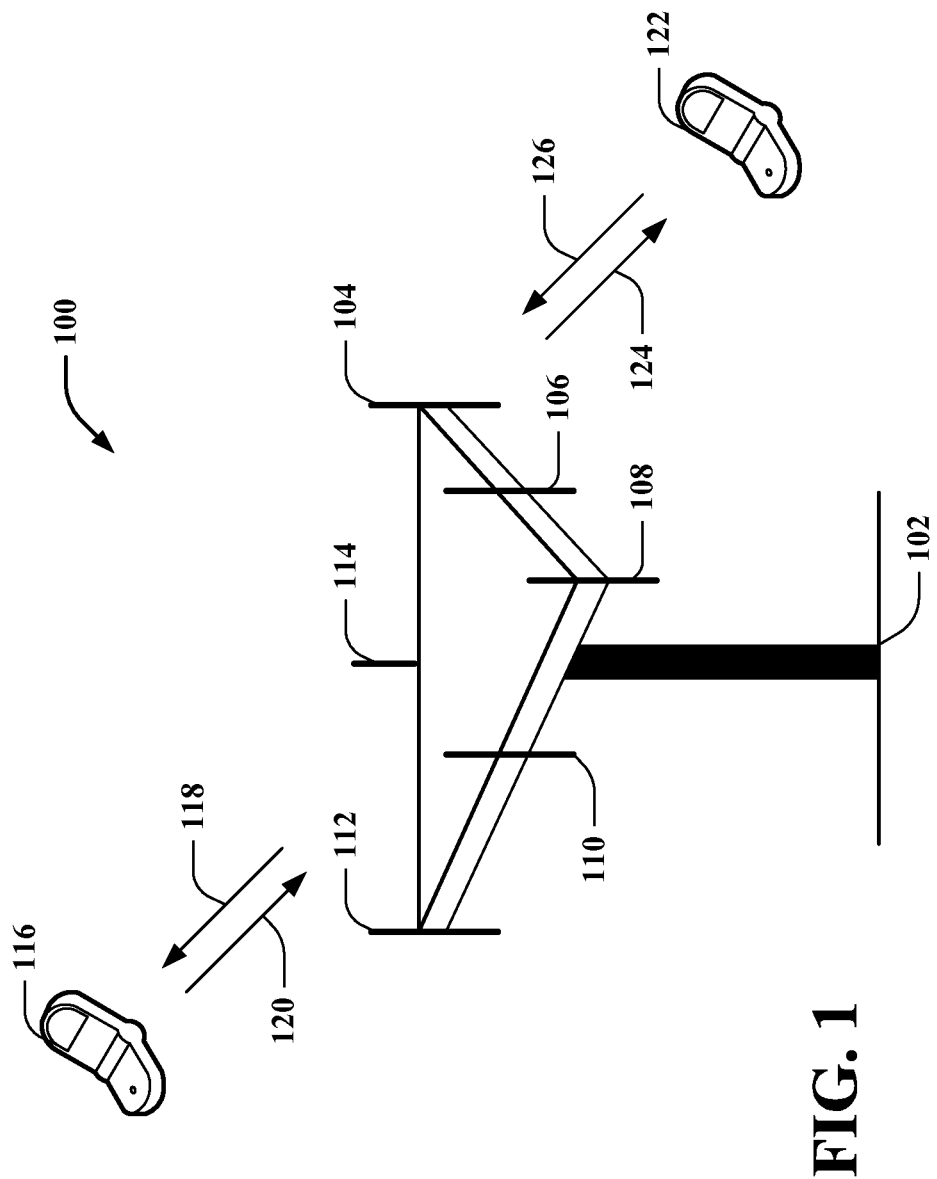
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

The subject specification discloses a method and apparatus that facilitates ANR support via backhaul-based communications. To this end, it is first noted that ANR is particularly desirable for HeNBs, which are deployed in an unplanned manner and need to auto-configure a large range of parameters based on their surrounding conditions. In embodiments described herein, enabling backhaul-based ANR for HeNBs may facilitate several use cases.

In a first use case, for example, backhaul-based communications facilitate expanding ANR utility. For instance, when a HeNB begins to operate, it may have few or no UEs associated with it. Therefore, the primary user equipment-based ANR may not be effective for a new HeNB. Exchanging configuration information over the backhaul, however, allows a new HeNB to find out about the neighboring base station parameters (e.g. a physical cell identifier (PCI), an automatic neighbor relation parameter, an evolved absolute radio frequency channel number (EARFCN), etc.). The backhaul information can also include a list of neighbors of the neighboring eNB/HeNB. Moreover, the new HeNB can further exchange information with a subset of these new (H)eNBs over the backhaul, and potentially learn of their neighbors as well. This populates the neighbor relation table of a new HeNB quickly, which significantly speeds up the ANR process.

In a second use case, backhaul-based communications facilitate a more efficient PCI selection mechanism. To this end, it is first noted that ANR for HeNBs improves the robustness of a distributed PCI Selection algorithm, which is a necessary mechanism for HeNBs. Once a neighbor is discovered by a new HeNB, it can exchange information with this neighbor, and learn of all the neighboring base stations, together with their corresponding PCI. The new HeNB can then repeat this exchange with a subset of the newly learnt neighbors. By crawling to neighbors that are two or more hops away, the new HeNB can quickly learn of the PCIs of many more neighboring base stations, wherein such information may be used to augment the PCI selection algorithm.

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA), High Speed Packet Access (HSPA), and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

High speed packet access (HSPA) can include high speed downlink packet access (HSDPA) technology and high speed uplink packet access (HSUPA) or enhanced uplink (EUL) technology and can also include HSPA+ technology. HSDPA, HSUPA and HSPA+ are part of the Third Generation Partnership Project (3GPP) specifications Release 5, Release 6, and Release 7, respectively.

High speed downlink packet access (HSDPA) optimizes data transmission from the network to the user equipment (UE). As used herein, transmission from the network to the user equipment UE can be referred to as the "downlink" (DL). Transmission methods can allow data rates of several Mbits/s. High speed downlink packet access (HSDPA) can increase the capacity of mobile radio networks. High speed uplink packet access (HSUPA) can optimize data transmission from the terminal to the network. As used herein, transmissions from the terminal to the network can be referred to as the "uplink" (UL). Uplink data transmission methods can allow data rates of several Mbit/s. HSPA+ provides even further improvements both in the uplink and downlink as specified in Release 7 of the 3GPP specification. High speed packet access (HSPA) methods typically allow for faster interactions between the downlink and the uplink in data services transmitting large volumes of data, for instance Voice over IP (VoIP), videoconferencing and mobile office applications Fast data transmission protocols such as hybrid automatic repeat request, (HARQ) can be used on the uplink and downlink. Such protocols, such as hybrid automatic repeat request (HARQ), allow a recipient to automatically request retransmission of a packet that might have been received in error.

Various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB), or some other terminology. Similarly, various embodiments are described herein in connection with access point base stations, wherein an access point base station can also be utilized for communicating with access terminal(s), and wherein access point base stations may be referred to as a femto cells, Home Node B units (HNBs), Home Evolved Node B units (HeNB), or some other terminology.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring base stations can be subject to less interference as compared to a base station transmitting through a single antenna to all its access terminals.

Figure 2:
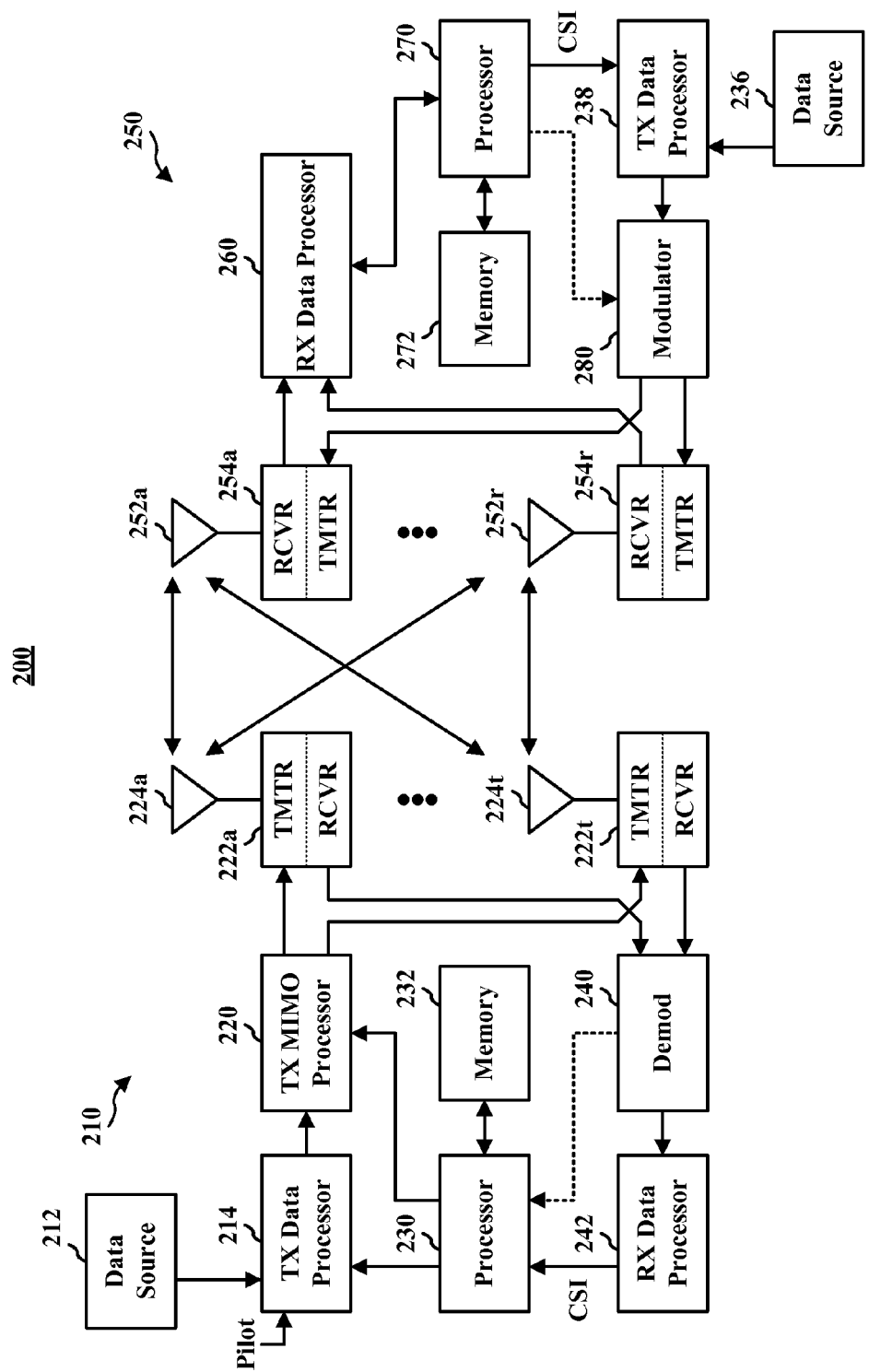
FIG. 2 is an illustration of an exemplary wireless network environment that can be employed in conjunction with the various systems and methods described herein.

FIG. 2 shows an example wireless communication system 200. The wireless communication system 200 depicts one base station 210 and one access terminal 250 for sake of brevity. However, it is to be appreciated that system 200 can include more than one base station and/or more than one access terminal, wherein additional base stations and/or access terminals can be substantially similar or different from example base station 210 and access terminal 250 described below. In addition, it is to be appreciated that base station 210 and/or access terminal 250 can employ the systems and/or methods described herein to facilitate wireless communication there between.

At base station 210, traffic data for a number of data streams is provided from a data source 212 to a transmit (TX) data processor 214. According to an example, each data stream can be transmitted over a respective antenna. TX data processor 214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 230.

The modulation symbols for the data streams can be provided to a TX MIMO processor 220, which can further process the modulation symbols (e.g., for OFDM). TX MIMO processor 220 then provides $N_T$ modulation symbol streams to $N_T$ transmitters (TMTR) 222a through 222t. In various embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 222a through 222t are transmitted from $N_T$ antennas 224a through 224t, respectively.

At access terminal 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective signal, digitizes the conditioned signal to provide samples, and further processes the samples to provide a corresponding "received" symbol stream.

An RX data processor 260 can receive and process the $N_R$ received symbol streams from $N_R$ receivers 254 based on a particular receiver processing technique to provide $N_T$ "detected" symbol streams. RX data processor 260 can demodulate, deinterleave, and decode each detected symbol stream to recover the traffic data for the data stream. The processing by RX data processor 260 is complementary to that performed by TX MIMO processor 220 and TX data processor 214 at base station 210.

A processor 270 can periodically determine which available technology to utilize as discussed above. Further, processor 270 can formulate a reverse link message comprising a matrix index portion and a rank value portion.

The reverse link message can comprise various types of information regarding the communication link and/or the received data stream. The reverse link message can be processed by a TX data processor 238, which also receives traffic data for a number of data streams from a data source 236, modulated by a modulator 280, conditioned by transmitters 254a through 254r, and transmitted back to base station 210.

At base station 210, the modulated signals from access terminal 250 are received by antennas 224, conditioned by receivers 222, demodulated by a demodulator 240, and processed by a RX data processor 242 to extract the reverse link message transmitted by access terminal 250. Further, processor 230 can process the extracted message to determine which precoding matrix to use for determining the beamforming weights.

Processors 230 and 270 can direct (e.g., control, coordinate, manage, etc.) operation at base station 210 and access terminal 250, respectively. Respective processors 230 and 270 can be associated with memory 232 and 272 that store program codes and data. Processors 230 and 270 can also perform computations to derive frequency and impulse response estimates for the uplink and downlink, respectively.

Figure 3:
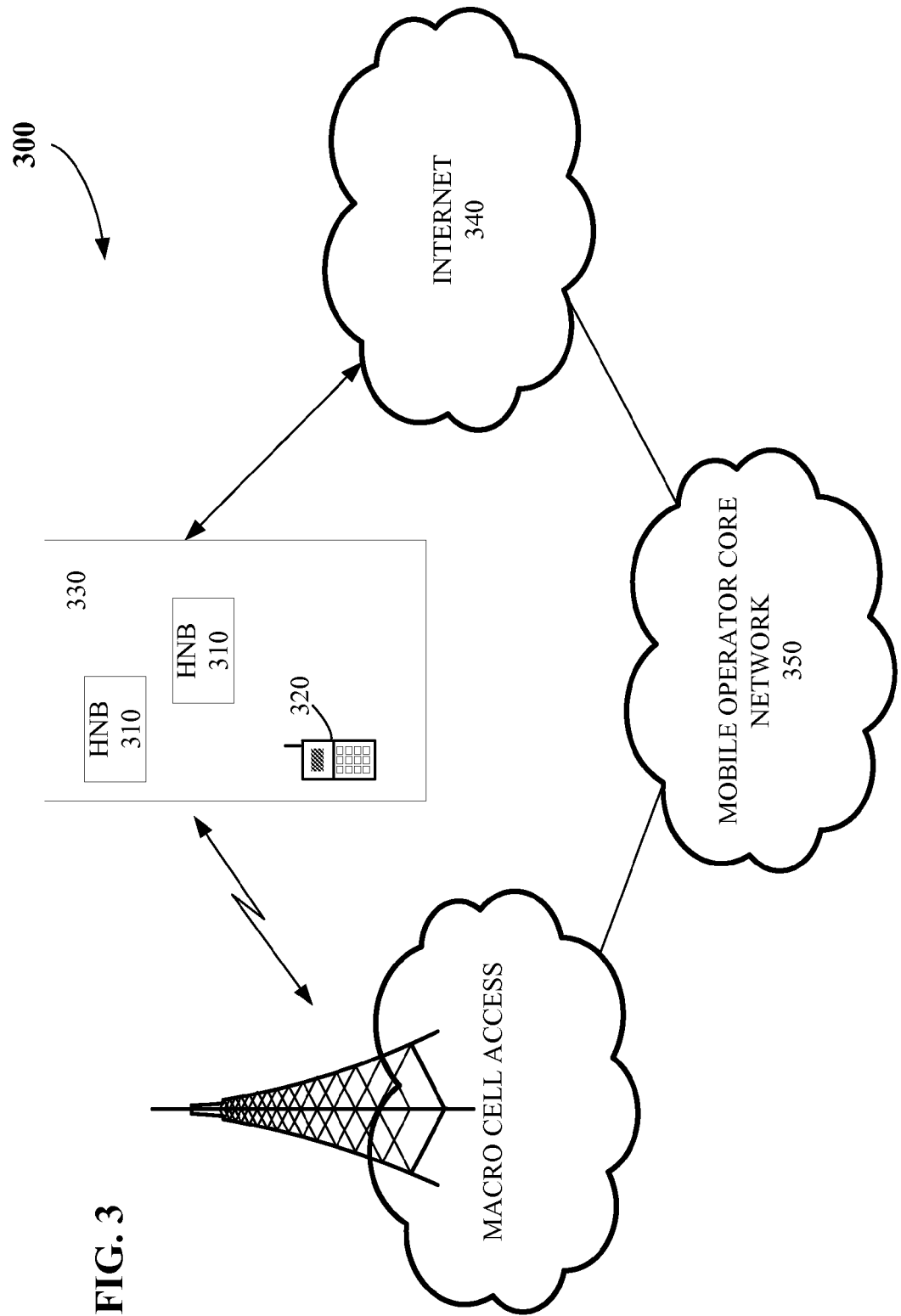
FIG. 3 illustrates an exemplary communication system that enables deployment of access point base stations within a network environment.

FIG. 3 illustrates an exemplary communication system to enable deployment of access point base stations within a network environment. As shown in FIG. 3, the system 300 includes multiple access point base stations or, in the alternative, femto cells, Home Node B units (HNBs), or Home evolved Node B units (HeNBs), such as, for example, HNBs 310, each being installed in a corresponding small scale network environment, such as, for example, in one or more user residences 330, and being configured to serve associated, as well as alien, user equipment (UE) or mobile stations 320. Each HNB 310 is further coupled to the Internet 340 and a mobile operator core network 350 via a DSL router (not shown) or, alternatively, a cable modem (not shown).

Figure 4:
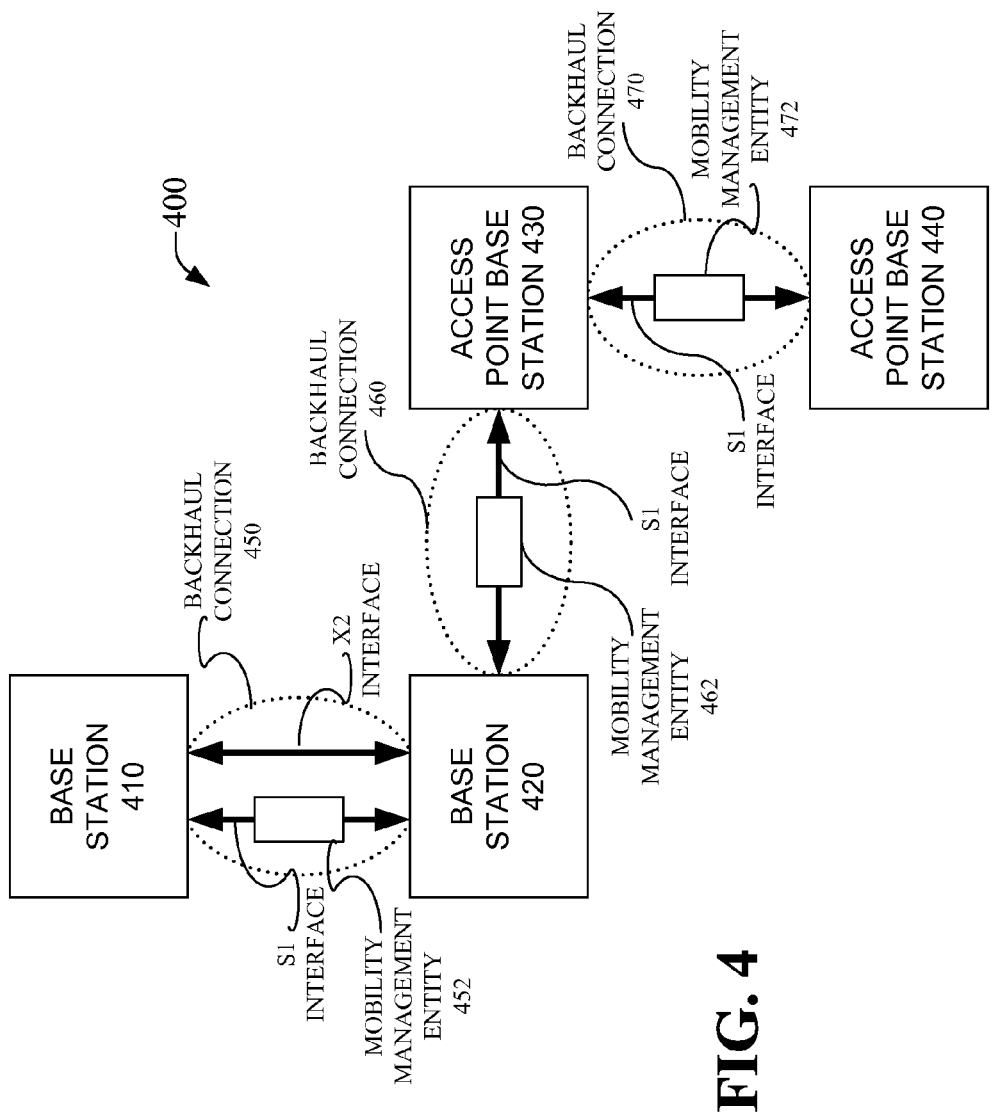
FIG. 4 is an overview of an exemplary environment that facilitates backhaul-based communications in accordance with an aspect of the subject specification.

Referring next to FIG. 4, an overview of an exemplary system that facilitates backhaul-based communications in accordance with an aspect of the subject specification is provided. As illustrated, system 400 includes base station 410, base station 420, access point base station 430, and access point base station 440. Here, it is contemplated that backhaul connections are provided either by an S1 interface via a mobility management entity or by an X2 interface, wherein base stations 410 and 420 are conventional base stations (e.g., eNBs), and wherein access point base stations 430 and 440 are femto cells (e.g., HeNBs). For this particular embodiment, since HeNBs do not support X2 interfaces, an S1 interface via mobility management entity 462 is used to support the backhaul connection 460 between base station 420 and access point base station 430, whereas the backhaul connection 470 between access point base station 430 and access point base station 440 is provided by an S1 interface via mobility management entity 472. The backhaul connection 450 between base station 410 and base station 420, however, can be supported either by an S1 interface via mobility management entity 452 or by an X2 interface, as shown.

In an aspect, a self-organizing-network (SON) configuration transfer information element (IE) is transparently exchanged between two eNBs. Within such embodiment, the exchange may occur via a mobility management entity (MME(s)) over the S1 application protocol interface. In a further aspect, the contents of the eNB configuration update message (e.g., from the X2 application protocol) are optionally added to the SON configuration transfer IE, wherein such message may include any of various IEs. For instance, any of the following IEs may be included: "Served cells to add" IE (which may include neighbor information), "Served cells to modify" IE (which may include neighbor information), "Served cells to delete" IE, "GU group ID to add" IE, and/or "GU group ID to delete" IE. In another aspect, a common location for specifying containers that are common to both S1 and X2 interfaces is contemplated. To this end, it may be desirable to utilize the above information for such a common specification since the same information should be exchanged.

Figure 5:
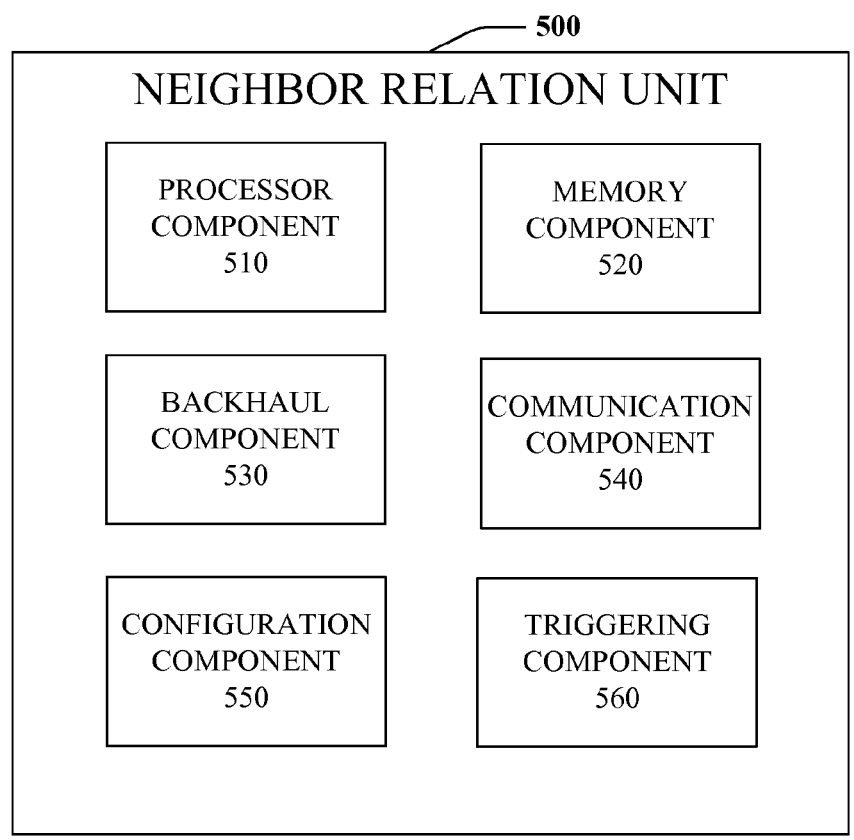
FIG. 5 illustrates a block diagram of an exemplary neighbor relation unit that facilitates a backhaul-based communication between access points in accordance with an aspect of the subject specification.

Referring next to FIG. 5, a block diagram of an exemplary neighbor relation unit that facilitates supporting backhaul-based ANR according to an embodiment is provided. As shown, neighbor relation unit 500 may include processor component 510, memory component 520, backhaul component 530, communication component 540, configuration component 550, and triggering component 560. Here, it should be appreciated that neighbor relation unit 500 may reside in a base station (e.g., eNB) or access point base station (e.g., HeNB), for instance.

In one aspect, processor component 510 is configured to execute computer-readable instructions related to performing any of a plurality of functions. Processor component 510 can be a single processor or a plurality of processors dedicated to analyzing information to be communicated from neighbor relation unit 500 and/or generating information that can be utilized by memory component 520, backhaul component 530, communication component 540, configuration component 550, and/or triggering component 560. Additionally or alternatively, processor component 510 may be configured to control one or more components neighbor relation unit 500.

In another aspect, memory component 520 is coupled to processor component 510 and configured to store computer-readable instructions executed by processor component 510. Memory component 520 may also be configured to store any of a plurality of other types of data including data generated by any of backhaul component 530, communication component 540, configuration component 550, and/or triggering component 560. Memory component 520 can be configured in a number of different configurations, including as random access memory, battery-backed memory, hard disk, magnetic tape, etc. Various features can also be implemented upon memory component 520, such as compression and automatic back up (e.g., use of a Redundant Array of Independent Drives configuration).

As illustrated, neighbor relation unit 500 also includes backhaul component 530, which is configured to establish a backhaul connection between an access point base station and a neighboring base station. Here, because the type of neighboring base station may vary, it should be noted that the backhaul connection may connect the access point base station to another access point base station or a conventional base station, for instance. It should be further noted that the backhaul connection may be established via an S1 interface by connecting the backhaul connection through a core network node (wherein the core network node can be a mobility management entity).

In another aspect, communication component 540 is coupled to processor component 510 and configured to interface neighbor relation unit 500 with external entities. For instance, communication component 540 may be configured to receive information associated with an external neighbor parameter via the backhaul connection. Here, it should be noted that the external neighbor parameter may include neighboring information pertaining to the neighboring base station, or extended neighbor information pertaining to an extended neighbor cell that is at least one hop away from the neighboring base station. Communication component 540 may also be configured to transmit an internal configuration update based on an internal neighbor parameter (i.e., neighboring information specific to the cell from which neighbor relation unit 500 resides). With either of the internal neighbor parameter and/or the external neighbor parameter any of various types of information may be included. For instance, such information may include a neighbor cell list, a physical cell identifier (PCI), an automatic neighbor relation parameter, an evolved absolute radio frequency channel number (EARFCN), a load-balancing parameter, a handover parameter, a power measurement parameter, and/or an interference management parameter.

In a further aspect, neighbor relation unit 500 may further include configuration component 550. Within such embodiment, configuration component 550 is configured to self-configure an internal neighbor parameter based on an external neighbor parameter. For instance, configuration component 550 may be configured to populate an internal neighbor list based on a neighbor list received from a neighboring base station, which may itself include a neighbor list received from a neighbor of the neighboring base station. In another aspect, configuration component 550 is configured to self-configure an internal PCI based on information received via the backhaul connection pertaining to neighboring PCIs (i.e., PCIs of immediate neighbors and/or PCIs of extended neighbors).

As illustrated, neighbor relation unit 500 may also include triggering component 560. In an aspect, triggering component 560 is configured to initiate a transmission of an internal configuration update according to a trigger. Here, it should be noted that the trigger may be a pre-determined trigger and/or a dynamic trigger, and that triggering component 560 may be configured in any of various ways. For instance, triggering component 560 may be configured to ascertain a transmission pattern pertaining to a plurality of external configuration updates, wherein the trigger is based on the transmission pattern. In another embodiment, triggering component 560 is configured to detect an activation of the access point base station, wherein the trigger is based on the activation. In yet another embodiment, triggering component 560 is configured to ascertain a random time offset, wherein the transmission of the internal configuration update is delayed based on the random time offset.

Figure 6:
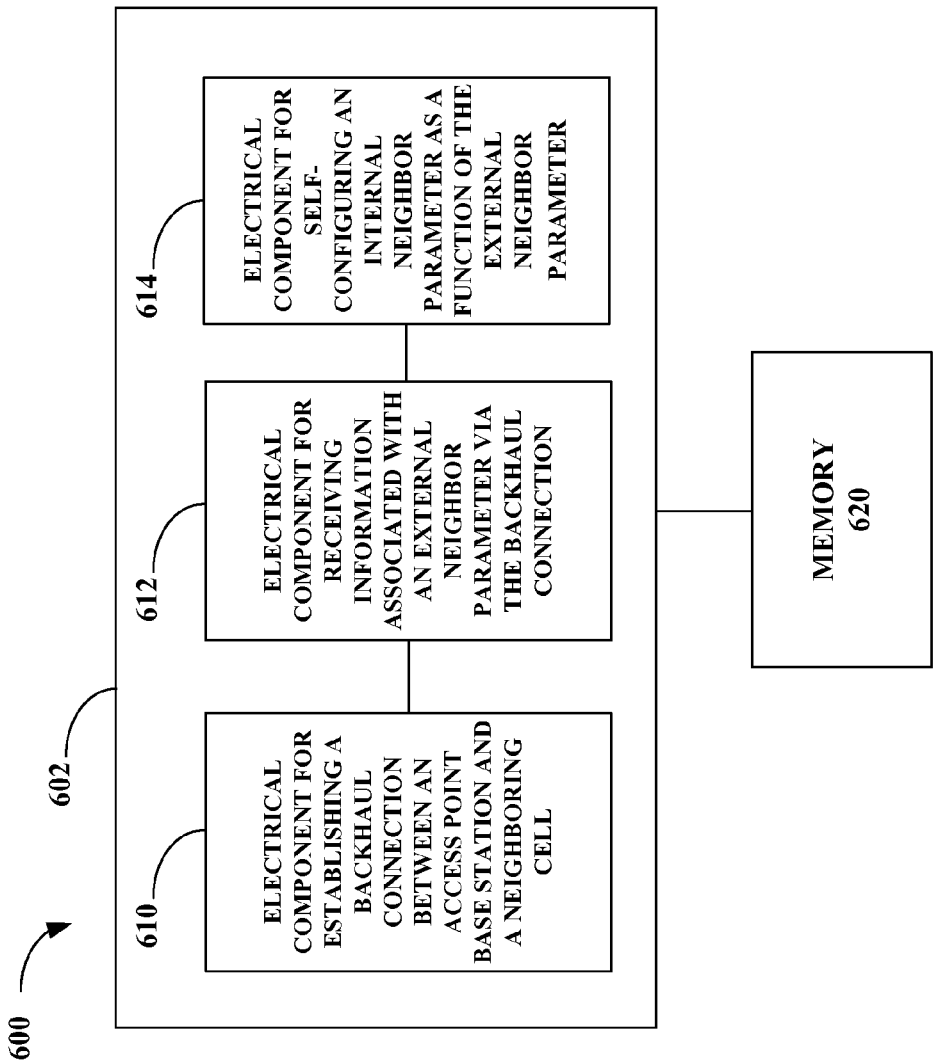
FIG. 6 is an illustration of an exemplary coupling of electrical components that effectuate a backhaul-based communication between access points according to an embodiment.

Referring next to FIG. 6, illustrated is a system 600 that facilitates backhaul-based ANR according to an embodiment. System 600 can reside within a base station (e.g., eNB) or access point base station (e.g., HeNB), for instance. System 600 includes functional blocks that can represent functions implemented by a processor, software, or combination thereof (e.g., firmware), wherein system 600 includes a logical grouping 602 of electrical components that can act in conjunction. As illustrated, logical grouping 602 can include an electrical component for establishing a backhaul connection between an access point base station and a neighboring base station 610. Furthermore, logical grouping 602 can include an electrical component for receiving information associated with an external neighbor parameter via the backhaul connection 612. Logical grouping 602 can also include an electrical component for self-configuring an internal neighbor parameter as a function of the external neighbor parameter 614. Additionally, system 600 can include a memory 620 that retains instructions for executing functions associated with electrical components 610, 612, and 614. While shown as being external to memory 620, it is to be understood that electrical components 610, 612, and 614 can exist within memory 620.

Figure 7:
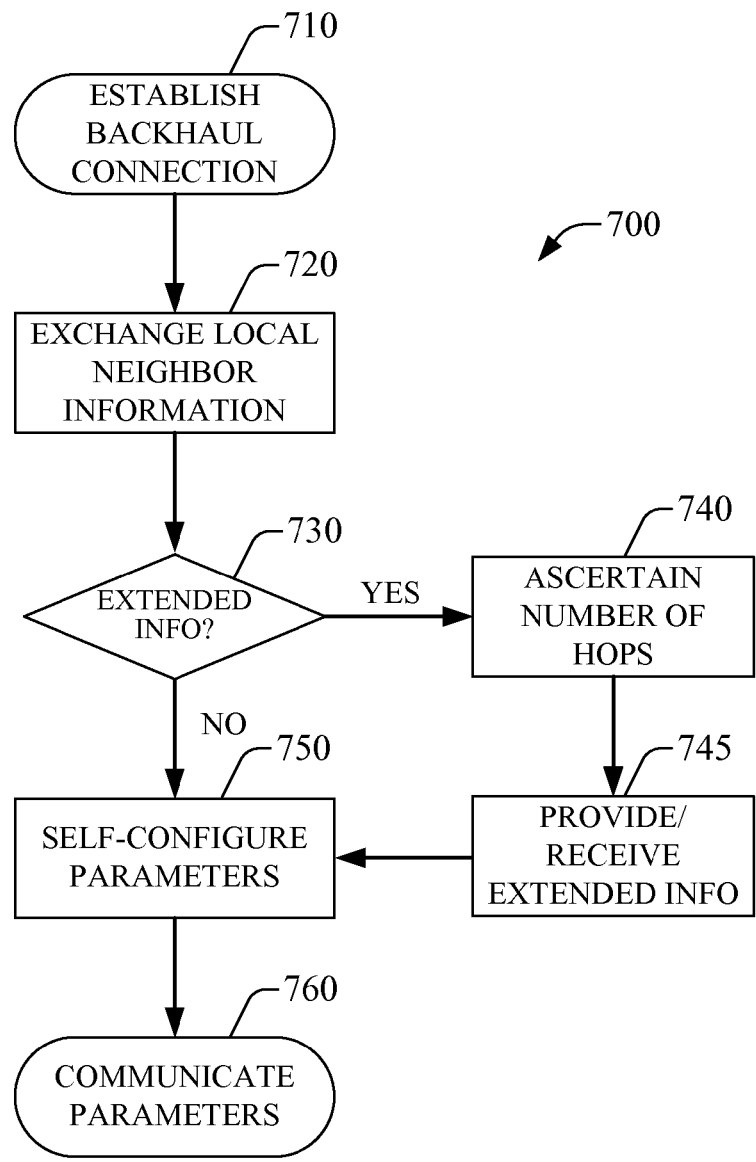
FIG. 7 is a flow chart illustrating an exemplary methodology for facilitating a self-configuration of neighbor relation parameters in accordance with an aspect of the subject specification.

Referring next to FIG. 7, a flow chart illustrating an exemplary method for facilitating a self-configuration of neighbor relation parameters is provided. As illustrated, process 700 includes a series of acts that may be performed by a base station (e.g., eNB) or access point base station (e.g., HeNB) according to an aspect of the subject specification. For instance, process 700 may be implemented by employing a processor to execute computer executable instructions stored on a computer readable storage medium to implement the series of acts. In another embodiment, a computer-readable storage medium comprising code for causing at least one computer to implement the acts of process 700 are contemplated.

In an aspect, process 700 begins at act 710 with the establishment of a backhaul connection between an access point base station and a neighboring base station. As stated previously, such backhaul connection can be between the access point base station and another access point base station, or between the access point base station and a conventional base station. Upon connecting, an exchange of local neighbor information can occur at act 720. Here, it should be appreciated that local neighbor information refers to parameters specific to either the access point base station or the neighboring base station. For instance, a neighbor cell list of an access point base station may be deemed "local" to that particular access point base station. Similarly, a neighbor cell list of a conventional base station (or access point base station) in a neighboring base station may be deemed "local" to that particular base station.

Next, at act 730, process 700 determines whether extended neighbor information is desired. Here, whereas local neighbor information refers to parameters specific to either the access point base station or the neighboring base station, extended neighbor information refers to parameters specific to neighbors of the access point base station or the neighboring base station. Moreover, extended neighbor information may include information pertaining to immediate neighbors (i.e., one hop away) and/or an extended neighbor base station (i.e., multiple hops away) of the access point base station or the neighboring base station. If no extended information is desired, process 700 proceeds to act 750 where internal neighbor parameters are configured based solely on the exchange of local neighbor information (e.g., an internal neighbor cell list can be populated, a PCI can be selected, etc.).

In an aspect, although process 700 can retrieve neighbor cell information from several hops away, it may be desirable to limit the number of hops from which information is retrieved (e.g., based on a tradeoff between processing time/costs and the relative value of further extended information). Accordingly, if extended neighbor information is indeed desired at act 730, process 700 proceeds by ascertaining a number of hops for the extended neighbor information at act 740. The extended neighbor information is then either received or provided at act 745. For example, the access point base station may receive extended neighbor information from the neighboring base station (i.e., extended neighbor information referring to parameters specific to neighbors of the neighboring base station), and/or the access point base station may provide extended neighbor information to the neighboring base station (i.e., extended neighbor information referring to parameters specific to neighbors of the access point base station).

Process 700 then proceeds to act 750 where a self-configuration of the internal neighbor parameters is performed. Here, however, such self-configuration can be based on any combination of the local neighbor information and/or extended neighbor information. Once the self-configuration has been performed, an update summarizing the self-configuration can be communicated at act 760.

It should be noted that triggers for sending configuration update information elements (IEs) for HeNBs via a self-organizing-network (SON) configuration transfer need not be the same as eNB configuration update messages. Indeed, in an aspect, it is contemplated that the HeNB ANR exchanges should be triggered only rarely. Moreover, for embodiments contemplating having containers that are common to both S1 and X2 interfaces, HeNB ANR exchanges could be instantiated only when a HeNB is activated to alleviate excess traffic, and during rare periodic (e.g. daily) updates. The exchange of configuration information for ANR over the backhaul can be further controlled by a random back-off mechanism (e.g. the HeNB needs to wait for a random time between 0 and 1000 seconds before it can initiate the exchange). This ensures that a flood of these messages do not originate at the same time, e.g. restoration of power after a failure.

Figure 8:
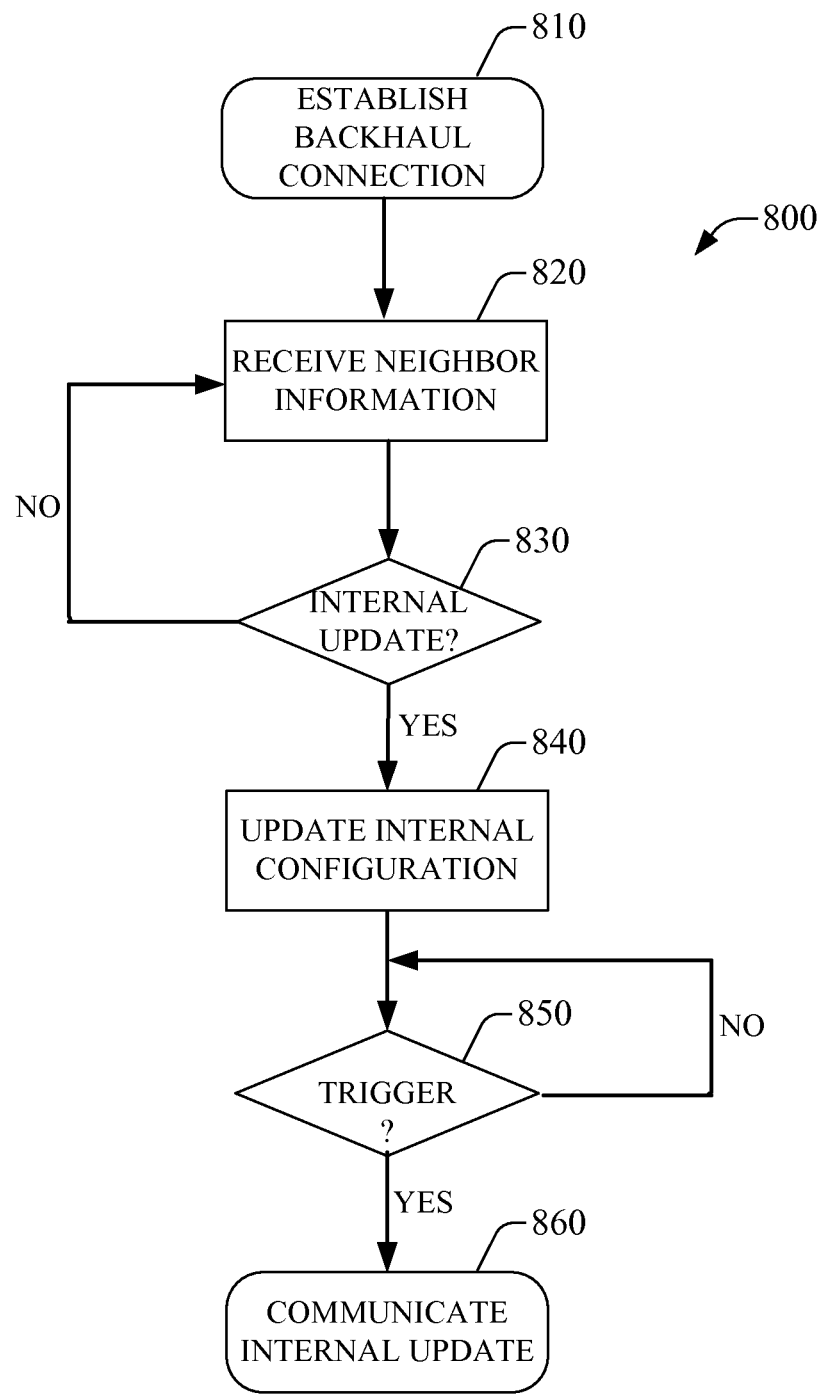
FIG. 8 is a flow chart illustrating an exemplary methodology for triggering a transmission of an internal neighbor relation parameter update in accordance with an aspect of the subject specification.

Referring next to FIG. 8, a flow chart illustrating an exemplary method for triggering a transmission of an internal neighbor relation parameter update is provided. As illustrated, process 800 also includes a series of acts that may be performed by a base station (e.g., eNB) or access point base station (e.g., HeNB) according to an aspect of the subject specification. For instance, process 800 may be implemented by employing a processor to execute computer executable instructions stored on a computer readable storage medium to implement the series of acts. In another embodiment, a computer-readable storage medium comprising code for causing at least one computer to implement the acts of process 800 are contemplated.

In an aspect, similar to process 700, process 800 begins with the establishment of a backhaul connection, at act 810, between an access point base station and a neighboring base station. Next, at act 820, neighbor information is received, which may include information pertaining to an immediate neighbor (i.e., one hop away) and/or information pertaining to an extended neighbor (i.e., multiple hops away).

For some aspects, upon receiving such neighbor information, no internal configuration update is required. In those instances, process 800 may simply loop back act 820 where more neighbor information is received. However, if an internal configuration update is indeed required, process 800 proceeds to act 840 where the update is performed.

Once the internal configuration has been updated, process 800 ascertains whether the update should be communicated. For this embodiment, process 800 determines whether a particular trigger has been triggered at act 850. Here, if a triggering event is not detected, process 800 may simply loop back and continue to monitor for triggering events. Otherwise, if a triggering event is indeed detected, process 800 concludes at act 860 where the internal update is communicated.

In an aspect, it should again be noted that the aforementioned trigger may be configured in any of various ways. For instance, such trigger may be a pre-determined trigger and/or a dynamic trigger. In an exemplary embodiment, a trigger is configured to monitor external configuration update transmission patterns, wherein the trigger is triggered according to the transmission pattern. In another embodiment, the trigger is based on an activation of the access point base station (or conventional base station). In yet another embodiment, once a trigger has been triggered, a transmission of the internal configuration update is delayed based on a random time offset.

Exemplary Communication System

Figure 9:
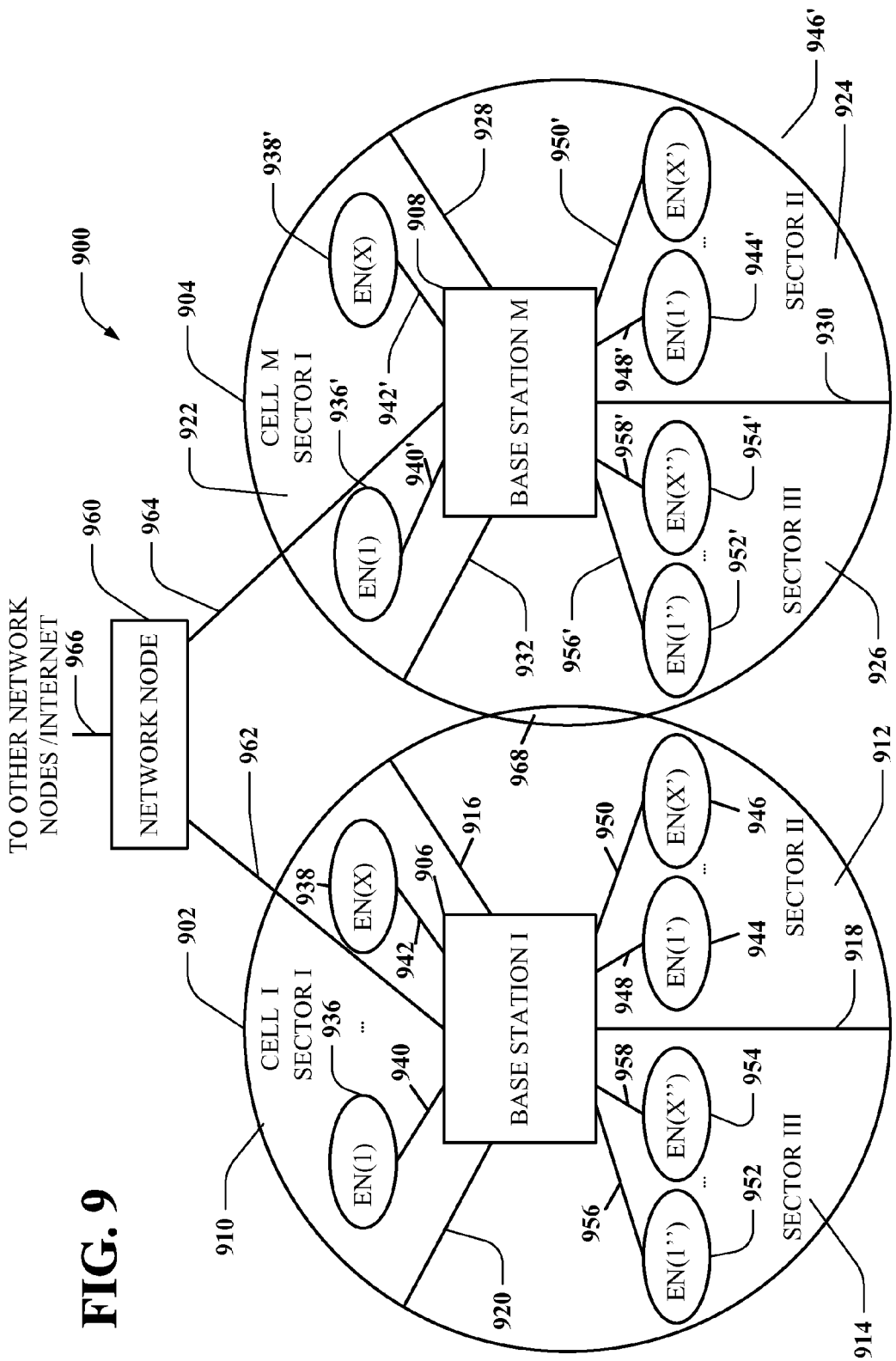
FIG. 9 is an illustration of an exemplary communication system implemented in accordance with various aspects including multiple cells.

Referring next to FIG. 9, an exemplary communication system 900 implemented in accordance with various aspects is provided including multiple cells: cell I 902, cell M 904. Here, it should be noted that neighboring cells 902, 904 overlap slightly, as indicated by cell boundary region 968, thereby creating potential for signal interference between signals transmitted by base stations in neighboring cells. Each cell 902, 904 of system 900 includes three sectors. Cells which have not been subdivided into multiple sectors (N=1), cells with two sectors (N=2) and cells with more than 3 sectors (N>3) are also possible in accordance with various aspects. Cell 902 includes a first sector, sector I 910, a second sector, sector II 912, and a third sector, sector III 914. Each sector 910, 912, and 914 has two sector boundary regions; each boundary region is shared between two adjacent sectors.

Sector boundary regions provide potential for signal interference between signals transmitted by base stations in neighboring sectors. Line 916 represents a sector boundary region between sector I 910 and sector II 912; line 918 represents a sector boundary region between sector II 912 and sector III 914; line 920 represents a sector boundary region between sector III 914 and sector I 910. Similarly, cell M 904 includes a first sector, sector I 922, a second sector, sector II 924, and a third sector, sector III 926. Line 928 represents a sector boundary region between sector I 922 and sector II 924; line 930 represents a sector boundary region between sector II 924 and sector III 926; line 932 represents a boundary region between sector III 926 and sector I 922. Cell I 902 includes a base station (BS), base station I 906, and a plurality of end nodes (ENs) in each sector 910, 912, 914. Sector I 910 includes EN(1) 936 and EN(X) 938 coupled to BS 906 via wireless links 940, 942, respectively; sector II 912 includes EN(1') 944 and EN(X') 946 coupled to BS 906 via wireless links 948, 950, respectively; sector III 914 includes EN(1") 952 and EN(X") 954 coupled to BS 906 via wireless links 956, 958, respectively. Similarly, cell M 904 includes base station M 908, and a plurality of end nodes (ENs) in each sector 922, 924, and 926. Sector I 922 includes EN(1) 936' and EN(X) 938' coupled to BS M 908 via wireless links 940', 942', respectively; sector II 924 includes EN(1') 944' and EN(X') 946' coupled to BS M 908 via wireless links 948', 950', respectively; sector 3 926 includes EN(1") 952' and EN(X") 954' coupled to BS 908 via wireless links 956', 958', respectively.

System 900 also includes a network node 960 which is coupled to BS I 906 and BS M 908 via network links 962, 964, respectively. Network node 960 is also coupled to other network nodes, e.g., other base stations, AAA server nodes, intermediate nodes, routers, etc. and the Internet via network link 966. Network links 962, 964, 966 may be, e.g., fiber optic cables. Each end node, e.g. EN 1 936 may be a wireless terminal including a transmitter as well as a receiver. The wireless terminals, e.g., EN(1) 936 may move through system 900 and may communicate via wireless links with the base station in the cell in which the EN is currently located. The wireless terminals, (WTs), e.g. EN(1) 936, may communicate with peer nodes, e.g., other WTs in system 900 or outside system 900 via a base station, e.g. BS 906, and/or network node 960. WTs, e.g., EN(1) 936 may be mobile communications devices such as cell phones, personal data assistants with wireless modems, etc. Respective base stations perform tone subset allocation using a different method for the strip-symbol periods, from the method employed for allocating tones and determining tone hopping in the rest symbol periods, e.g., non strip-symbol periods. The wireless terminals use the tone subset allocation method along with information received from the base station, e.g., base station slope ID, sector ID information, to determine tones that they can employ to receive data and information at specific strip-symbol periods. The tone subset allocation sequence is constructed, in accordance with various aspects to spread inter-sector and inter-cell interference across respective tones. Although the subject system was described primarily within the context of cellular mode, it is to be appreciated that a plurality of modes may be available and employable in accordance with aspects described herein.

Exemplary Base Station

Figure 10:
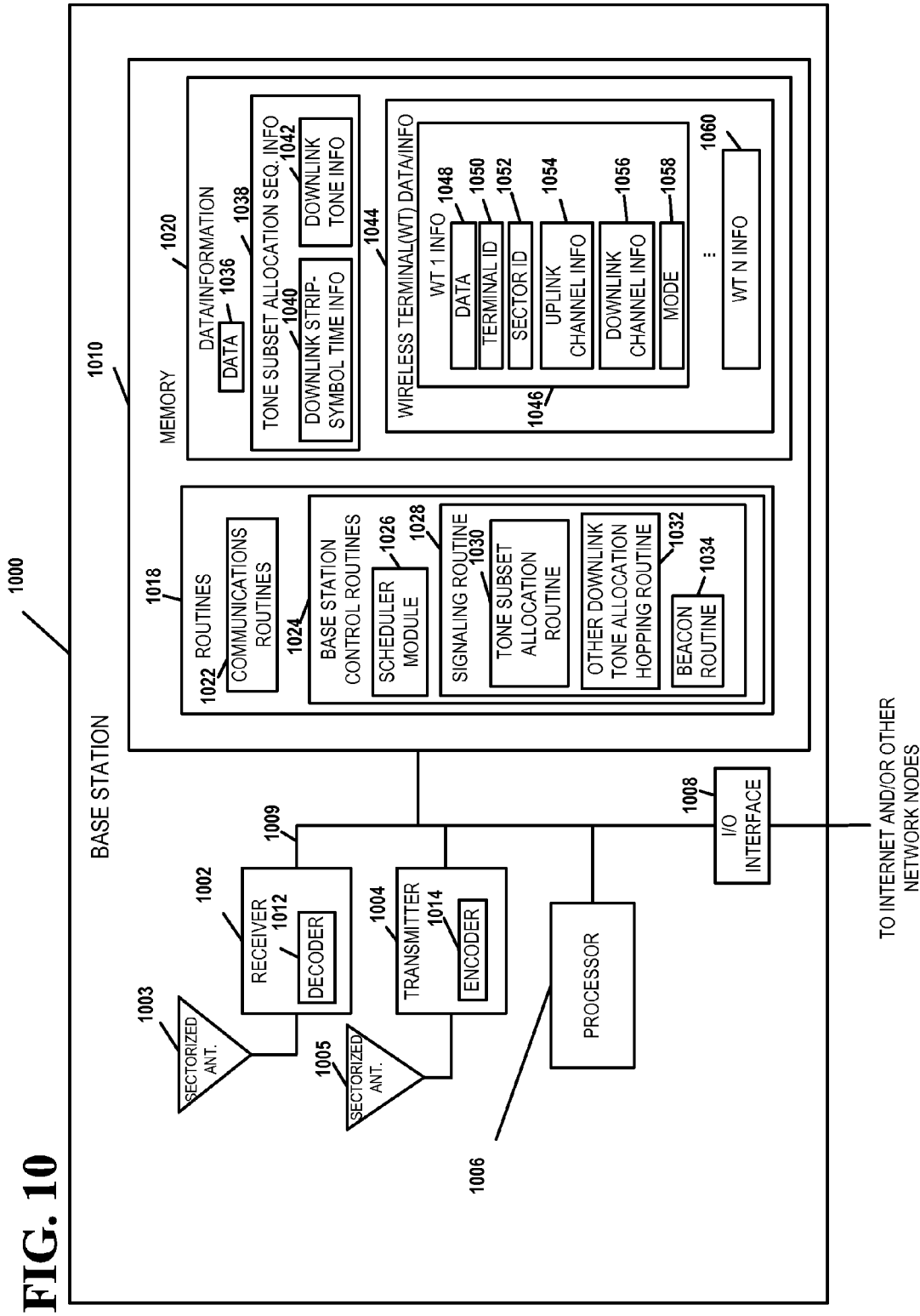
FIG. 10 is an illustration of an exemplary base station in accordance with various aspects described herein.

FIG. 10 illustrates an example base station 1000 in accordance with various aspects. Base station 1000 implements tone subset allocation sequences, with different tone subset allocation sequences generated for respective different sector types of the cell. Base station 1000 may be used as any one of base stations 906, 908 of the system 900 of FIG. 9. The base station 1000 includes a receiver 1002, a transmitter 1004, a processor 1006, e.g., CPU, an input/output interface 1008 and memory 1010 coupled together by a bus 1009 over which various elements 1002, 1004, 1006, 1008, and 1010 may interchange data and information.

Sectorized antenna 1003 coupled to receiver 1002 is used for receiving data and other signals, e.g., channel reports, from wireless terminals transmissions from each sector within the base station's cell. Sectorized antenna 1005 coupled to transmitter 1004 is used for transmitting data and other signals, e.g., control signals, pilot signal, beacon signals, etc. to wireless terminals 1100 (see FIG. 11) within each sector of the base station's cell. In various aspects, base station 1000 may employ multiple receivers 1002 and multiple transmitters 1004, e.g., an individual receivers 1002 for each sector and an individual transmitter 1004 for each sector. Processor 1006, may be, e.g., a general purpose central processing unit (CPU). Processor 1006 controls operation of base station 1000 under direction of one or more routines 1018 stored in memory 1010 and implements the methods. I/O interface 1008 provides a connection to other network nodes, coupling the BS 1000 to other base stations, access routers, AAA server nodes, etc., other networks, and the Internet. Memory 1010 includes routines 1018 and data/information 1020.

Data/information 1020 includes data 1036, tone subset allocation sequence information 1038 including downlink strip-symbol time information 1040 and downlink tone information 1042, and wireless terminal (WT) data/info 1044 including a plurality of sets of WT information: WT 1 info 1046 and WT N info 1060. Each set of WT info, e.g., WT 1 info 1046 includes data 1048, terminal ID 1050, sector ID 1052, uplink channel information 1054, downlink channel information 1056, and mode information 1058.

Routines 1018 include communications routines 1022 and base station control routines 1024. Base station control routines 1024 includes a scheduler module 1026 and signaling routines 1028 including a tone subset allocation routine 1030 for strip-symbol periods, other downlink tone allocation hopping routine 1032 for the rest of symbol periods, e.g., non strip-symbol periods, and a beacon routine 1034.

Data 1036 includes data to be transmitted that will be sent to encoder 1014 of transmitter 1004 for encoding prior to transmission to WTs, and received data from WTs that has been processed through decoder 1012 of receiver 1002 following reception. Downlink strip-symbol time information 1040 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 1042 includes information including a carrier frequency assigned to the base station 1000, the number and frequency of tones, and the set of tone subsets to be allocated to the strip-symbol periods, and other cell and sector specific values such as slope, slope index and sector type.

Data 1048 may include data that WT1 1100 has received from a peer node, data that WT 1 1100 desires to be transmitted to a peer node, and downlink channel quality report feedback information. Terminal ID 1050 is a base station 1000 assigned ID that identifies WT 1 1100. Sector ID 1052 includes information identifying the sector in which WT1 1100 is operating. Sector ID 1052 can be used, for example, to determine the sector type. Uplink channel information 1054 includes information identifying channel segments that have been allocated by scheduler 1026 for WT1 1100 to use, e.g., uplink traffic channel segments for data, dedicated uplink control channels for requests, power control, timing control, etc. Each uplink channel assigned to WT1 1100 includes one or more logical tones, each logical tone following an uplink hopping sequence. Downlink channel information 1056 includes information identifying channel segments that have been allocated by scheduler 1026 to carry data and/or information to WT1 1100, e.g., downlink traffic channel segments for user data. Each downlink channel assigned to WT1 1100 includes one or more logical tones, each following a downlink hopping sequence. Mode information 1058 includes information identifying the state of operation of WT1 1100, e.g. sleep, hold, on.

Communications routines 1022 control the base station 1000 to perform various communications operations and implement various communications protocols. Base station control routines 1024 are used to control the base station 1000 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 1028 controls the operation of receiver 1002 with its decoder 1012 and transmitter 1004 with its encoder 1014. The signaling routine 1028 is responsible controlling the generation of transmitted data 1036 and control information. Tone subset allocation routine 1030 constructs the tone subset to be used in a strip-symbol period using the method of the aspect and using data/info 1020 including downlink strip-symbol time info 1040 and sector ID 1052. The downlink tone subset allocation sequences will be different for each sector type in a cell and different for adjacent cells. The WTs 1100 receive the signals in the strip-symbol periods in accordance with the downlink tone subset allocation sequences; the base station 1000 uses the same downlink tone subset allocation sequences in order to generate the transmitted signals. Other downlink tone allocation hopping routine 1032 constructs downlink tone hopping sequences, using information including downlink tone information 1042, and downlink channel information 1056, for the symbol periods other than the strip-symbol periods. The downlink data tone hopping sequences are synchronized across the sectors of a cell. Beacon routine 1034 controls the transmission of a beacon signal, e.g., a signal of relatively high power signal concentrated on one or a few tones, which may be used for synchronization purposes, e.g., to synchronize the frame timing structure of the downlink signal and therefore the tone subset allocation sequence with respect to an ultra-slot boundary.

Exemplary Wireless Terminal

Figure 11:
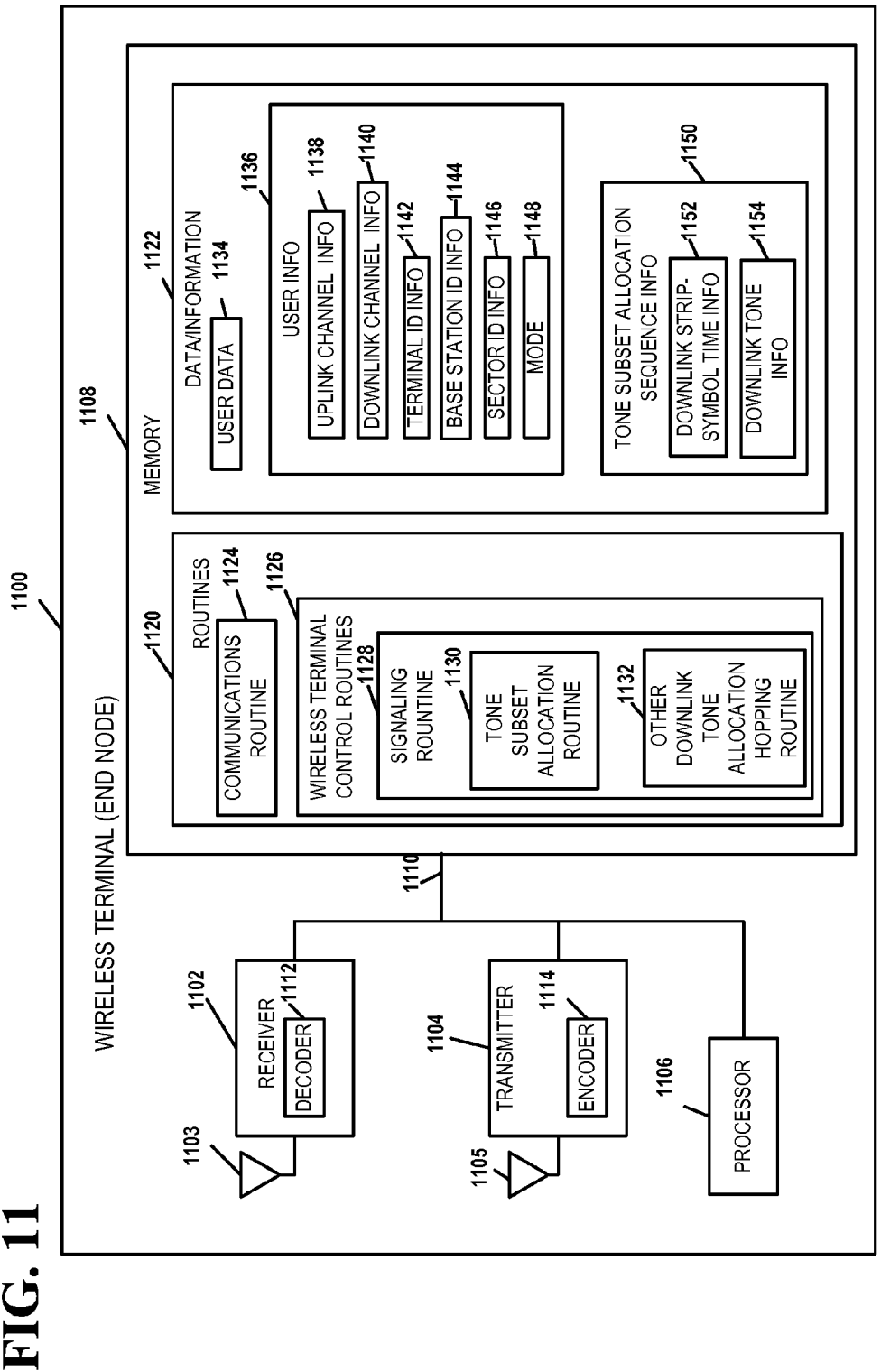
FIG. 11 is an illustration of an exemplary wireless terminal implemented in accordance with various aspects described herein.

FIG. 11 illustrates an example wireless terminal (end node) 1100 which can be used as any one of the wireless terminals (end nodes), e.g., EN(1) 936, of the system 900 shown in FIG. 9. Wireless terminal 1100 implements the tone subset allocation sequences. The wireless terminal 1100 includes a receiver 1102 including a decoder 1112, a transmitter 1104 including an encoder 1114, a processor 1106, and memory 1108 which are coupled together by a bus 1110 over which the various elements 1102, 1104, 1106, 1108 can interchange data and information. An antenna 1103 used for receiving signals from a base station (and/or a disparate wireless terminal) is coupled to receiver 1102. An antenna 1105 used for transmitting signals, e.g., to a base station (and/or a disparate wireless terminal) is coupled to transmitter 1104.

The processor 1106, e.g., a CPU controls the operation of the wireless terminal 1100 and implements methods by executing routines 1120 and using data/information 1122 in memory 1108.

Data/information 1122 includes user data 1134, user information 1136, and tone subset allocation sequence information 1150. User data 1134 may include data, intended for a peer node, which will be routed to encoder 1114 for encoding prior to transmission by transmitter 1104 to a base station, and data received from the base station which has been processed by the decoder 1112 in receiver 1102. User information 1136 includes uplink channel information 1138, downlink channel information 1140, terminal ID information 1142, base station ID information 1144, sector ID information 1146, and mode information 1148. Uplink channel information 1138 includes information identifying uplink channels segments that have been assigned by a base station for wireless terminal 1100 to use when transmitting to the base station. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 1140 includes information identifying downlink channel segments that have been assigned by a base station to WT 1100 for use when the base station is transmitting data/information to WT 1100. Downlink channels may include downlink traffic channels and assignment channels, each downlink channel including one or more logical tone, each logical tone following a downlink hopping sequence, which is synchronized between each sector of the cell.

User info 1136 also includes terminal ID information 1142, which is a base station-assigned identification, base station ID information 1144 which identifies the specific base station that WT has established communications with, and sector ID info 1146 which identifies the specific sector of the cell where WT 1100 is presently located. Base station ID 1144 provides a cell slope value and sector ID info 1146 provides a sector index type; the cell slope value and sector index type may be used to derive tone hopping sequences. Mode information 1148 also included in user info 1136 identifies whether the WT 1100 is in sleep mode, hold mode, or on mode.

Tone subset allocation sequence information 1150 includes downlink strip-symbol time information 1152 and downlink tone information 1154. Downlink strip-symbol time information 1152 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1154 includes information including a carrier frequency assigned to the base station, the number and frequency of tones, and the set of tone subsets to be allocated to the strip-symbol periods, and other cell and sector specific values such as slope, slope index and sector type.

Routines 1120 include communications routines 1124 and wireless terminal control routines 1126. Communications routines 1124 control the various communications protocols used by WT 1100. Wireless terminal control routines 1126 controls basic wireless terminal 1100 functionality including the control of the receiver 1102 and transmitter 1104. Wireless terminal control routines 1126 include the signaling routine 1128. The signaling routine 1128 includes a tone subset allocation routine 1130 for the strip-symbol periods and an other downlink tone allocation hopping routine 1132 for the rest of symbol periods, e.g., non strip-symbol periods. Tone subset allocation routine 1130 uses user data/info 1122 including downlink channel information 1140, base station ID info 1144, e.g., slope index and sector type, and downlink tone information 1154 in order to generate the downlink tone subset allocation sequences in accordance with some aspects and process received data transmitted from the base station. Other downlink tone allocation hopping routine 1130 constructs downlink tone hopping sequences, using information including downlink tone information 1154, and downlink channel information 1140, for the symbol periods other than the strip-symbol periods. Tone subset allocation routine 1130, when executed by processor 1106, is used to determine when and on which tones the wireless terminal 1100 is to receive one or more strip-symbol signals from the base station 1000. The uplink tone allocation hopping routine 1130 uses a tone subset allocation function, along with information received from the base station, to determine the tones in which it should transmit on.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

When the embodiments are implemented in program code or code segments, it should be appreciated that a code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc. Additionally, in some aspects, the steps and/or actions of a method or algorithm can reside as one or any combination or set of codes and/or instructions on a machine readable medium and/or computer readable medium, which can be incorporated into a computer program product.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, as used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

What is claimed is:

1. A method that facilitates a communication between access points, the method comprising:
   establishing a backhaul connection between an access point base station and a neighboring base station;
   exchanging information associated with an external neighbor parameter via the backhaul connection, wherein the external neighbor parameter includes extended neighbor information pertaining to an extended neighbor base station, the extended neighbor base station being at least one hop away from the neighboring base station, the extended neighbor base station comprising neighbors of a neighboring evolved NodeB (eNB) or evolved Home NodeB (HeNB);
   self-configuring an internal neighbor parameter comprising a neighbor relation table as a function of the external neighbor parameter;
   transmitting an internal configuration update, wherein the internal configuration update is based on the internal neighbor parameter;
   triggering the transmitting according to a trigger;
   ascertaining a transmission pattern pertaining to a plurality of external configuration updates;
   detecting an activation of the access point base station; and
   ascertaining a random time offset, the transmitting delayed based on the random time offset,
   wherein the trigger is based at least in part on at least one of the transmission pattern or the activation.

2. The method of claim 1, the establishing comprising connecting the backhaul connection through a core network node.

3. The method of claim 2, wherein the core network node is a mobility management entity.

4. The method of claim 1, the establishing comprising connecting the backhaul connection via an S1 interface.

5. The method of claim 1, wherein at least one of the internal neighbor parameter or the external neighbor parameter is an automatic neighbor relation parameter.

6. The method of claim 1, wherein at least one of the internal neighbor parameter or the external neighbor parameter is a physical cell identifier (PCI).

7. The method of claim 1, wherein at least one of the internal neighbor parameter or the external neighbor parameter is an evolved absolute radio frequency channel number (EARFCN).

8. The method of claim 1, wherein at least one of the internal neighbor parameter or the external neighbor parameter is at least one of a load-balancing parameter, a handover parameter, a power measurement parameter, or an interference management parameter.

9. The method of claim 1, wherein the external neighbor parameter includes neighboring information pertaining to the neighboring base station.

10. An apparatus configured to facilitate a communication between access points, the apparatus comprising:
    a processor configured to execute computer executable components stored in memory, the components including:
    a backhaul component configured to establish a backhaul connection between an access point base station and a neighboring base station;
    a communication component configured to exchange information associated with an external neighbor parameter via the backhaul connection, wherein the external neighbor parameter includes extended neighbor information pertaining to an extended neighbor base station, the extended neighbor base station being at least one hop away from the neighboring base station, the extended neighbor base station comprising neighbors of a neighboring evolved NodeB (eNB) or evolved Home NodeB (HeNB), wherein the communication component is further configured to transmit an internal configuration update, wherein the internal configuration update based on the internal neighbor parameter; and
    a configuration component configured to self-configure an internal neighbor parameter comprising a neighbor relation table based on the external neighbor parameter; and
    a triggering component configured to:
      initiate a transmission of the internal configuration update according to a trigger;
      ascertain a transmission pattern pertaining to a plurality of external configuration updates;
      detect an activation of the access point base station; and
      ascertain a random time offset, the transmission delayed based on the random time offset,
    wherein the trigger is based at least in part on at least one of the transmission pattern or the activation.

11. The apparatus of claim 10, the backhaul component further configured to establish the backhaul connection via a core network node.

12. The apparatus of claim 11, wherein the core network node is a mobility management entity.

13. The apparatus of claim 10, the backhaul component further configured to establish the backhaul connection via an S1 interface.

14. The apparatus of claim 10, wherein at least one of the internal neighbor parameter or the external neighbor parameter is an automatic neighbor relation parameter.

15. The apparatus of claim 10, wherein at least one of the internal neighbor parameter or the external neighbor parameter is a physical cell identifier (PCI).

16. The apparatus of claim 10, wherein at least one of the internal neighbor parameter or the external neighbor parameter is an evolved absolute radio frequency channel number (EARFCN).

17. The apparatus of claim 10, wherein at least one of the internal neighbor parameter or the external neighbor parameter is at least one of a load-balancing parameter, a handover parameter, a power measurement parameter, or an interference management parameter.

18. The apparatus of claim 10, wherein the external neighbor parameter includes neighboring information pertaining to the neighboring base station.

19. A computer program product that facilitates a communication between access points, comprising:
a non-transitory computer-readable storage medium comprising code for causing at least one computer to:
provide a backhaul connection between an access point base station and a neighboring base station;
exchange information associated with an external neighbor parameter via the backhaul connection, wherein the external neighbor parameter includes extended neighbor information pertaining to an extended neighbor base station, the extended neighbor base station being at least one hop away from the neighboring base station, the extended neighbor base station comprising neighbors of a neighboring evolved NodeB (eNB) or evolved Home NodeB (HeNB); and
self-configure an internal neighbor parameter comprising a neighbor relation table according to the external neighbor parameter;
transmit an internal configuration update, wherein the internal configuration update based on the internal neighbor parameter;
trigger the transmitting according to a trigger;
ascertain a transmission pattern pertaining to a plurality of external configuration updates;
detect an activation of the access point base station; and
ascertain a random time offset, the transmitting delayed based on the random time offset,
wherein the trigger is based at least in part on at least one of the transmission pattern or the activation.

20. The computer program product of claim 19, the code further causing the at least one computer to provide the backhaul connection through a core network node.

21. The computer program product of claim 20, wherein the core network node is a mobility management entity.

22. The computer program product of claim 19, the code further causing the at least one computer to provide the backhaul connection via an S1 interface.

23. The computer program product of claim 19, wherein at least one of the internal neighbor parameter or the external neighbor parameter is an automatic neighbor relation parameter.

24. The computer program product of claim 19, wherein at least one of the internal neighbor parameter or the external neighbor parameter is a physical cell identifier (PCI).

25. The computer program product of claim 19, wherein at least one of the internal neighbor parameter or the external neighbor parameter is an evolved absolute radio frequency channel number (EARFCN).

26. The computer program product of claim 19, wherein at least one of the internal neighbor parameter or the external neighbor parameter is at least one of a load-balancing parameter, a handover parameter, a power measurement parameter, or an interference management parameter.

27. The computer program product of claim 19, wherein the external neighbor parameter includes neighboring information pertaining to the neighboring base station.

28. An apparatus configured to facilitate a communication between access points, the apparatus comprising:
means for connecting an access point base station and a neighboring base station via a backhaul connection;
means for exchanging information associated with an external neighbor parameter via the backhaul connection, wherein the external neighbor parameter includes extended neighbor information pertaining to an extended neighbor base station, the extended neighbor base station being at least one hop away from the neighboring base station, the extended neighbor base station comprising neighbors of a neighboring evolved NodeB (eNB) or evolved Home NodeB (HeNB); and
means for self-configuring an internal neighbor parameter comprising a neighbor relation table based on the external neighbor parameter;
means for transmitting an internal configuration update, wherein the internal configuration update based on the internal neighbor parameter;
means for triggering the transmitting according to a trigger;
means for ascertaining a transmission pattern pertaining to a plurality of external configuration updates, the trigger based on the transmission pattern;
means for detecting an activation of the access point base station; and
means for determining a random time offset,
wherein the trigger is based at least in part on at least one of the transmission pattern or the activation.

* * * * *